(12) United States Patent
Lin

(10) Patent No.: US 6,882,602 B2
(45) Date of Patent: Apr. 19, 2005

(54) CALIBRATION METHOD FOR CONTROL DEVICE OF OPTICAL STORAGE MEDIUM DRIVE

(75) Inventor: Meng-Fu Lin, Kao-Hsiung (TW)

(73) Assignee: VIA Technologies Inc., Hsin-Tien (TW)

( * ) Notice: Subject to any disclaimer, the term of this patent is extended or adjusted under 35 U.S.C. 154(b) by 541 days.

(21) Appl. No.: 10/063,441

(22) Filed: Apr. 24, 2002

(65) Prior Publication Data

US 2002/0176333 A1 Nov. 28, 2002

(30) Foreign Application Priority Data

May 25, 2001 (TW) .......................... 90112704 A

(51) Int. Cl.⁷ .............................................. G11B 7/00
(52) U.S. Cl. ................ 369/44.27; 369/53.1; 369/53.28; 369/44.25; 369/44.34
(58) Field of Search ............................ 369/47.1, 47.11, 369/47.5, 47.53, 53.1, 53.11, 53.19, 53.23, 53.28, 59.1, 44.25, 44.27, 44.34, 44.41

(56) References Cited

U.S. PATENT DOCUMENTS

| | | | | | |
|---|---|---|---|---|---|
| 5,526,329 | A | * | 6/1996 | Bish et al. | 369/124.11 |
| 5,978,335 | A | * | 11/1999 | Clark et al. | 369/53.34 |
| 6,157,601 | A | | 12/2000 | Kao et al. | |

* cited by examiner

Primary Examiner—Muhammad Edun
(74) Attorney, Agent, or Firm—Winston Hsu

(57) ABSTRACT

A calibration method for a control device of an optical storage medium drive includes generating a calibration-driving signal by a signal generator and then generating a sensing signal by a sensor according to the calibration-driving signal, determining whether each period of the sensing signal is suitable, and comparing suitable periods of the sensing signal with corresponding periods of the calibration-driving signal to determine a phase difference between the sensing signal and the calibration-driving signal so as to adjust gain of a control device of the optical storage medium drive according to the phase difference. The calibration method is capable of preventing the influence of unstable sensing signals and promoting the performance of the optical storage medium drive.

19 Claims, 5 Drawing Sheets

CALIBRATION METHOD FOR CONTROL DEVICE OF OPTICAL STORAGE MEDIUM DRIVE

BACKGROUND OF INVENTION

1. Field of the Invention

The invention relates to a calibration method for a control device of an optical storage medium drive, and more particularly, to a calibration method for selecting sensing signals according to a comparison rule so as to compensate gain of the control device of the optical storage medium drive.

2. Description of the Prior Art

In modern society, there has been a spread in the use of optical storage media, such as compact discs, as optical storage media for recording a huge amount of high-density digital information. The optical storage medium has advantages of lightweight, small size, durable, and large capacity for data storage. Meanwhile, a reproducing apparatus, also called an optical storage medium drive, is indispensable for reading out the information on optical storage medium.

Please refer to FIG. 1. FIG. 1 is a schematic diagram illustrating the inner construction of an optical storage medium drive 10. For clarity of illustration, unrelated parts of the optical storage medium drive 10 with respect to the present invention are omitted. The optical storage medium drive 10 is used to read data stored in an optical storage medium 12. The optical storage medium drive is for example, a compact disc (CD) drive or a digital versatile disc (DVD) drive. The optical storage medium is for example, a CD or a DVD. Also, only a portion of the optical storage medium 12 is shown in FIG. 1 for clarity. The optical storage medium drive 10 comprises a motor 16 for rotating a rotatable base 14 and further driving the optical storage medium 12 disposed on the rotatable base 14. For reading data on the optical storage medium 12, the optical storage medium drive 10 has a sled 19 capable of sliding left and right along a slide 20, i.e., along direction 21. A pickup head 18 is installed on the sled 19 and used to direct a light beam, such as a laser beam, to shine and focus onto a bottom surface of the optical storage medium 12. After incident light beam is reflected back to the pickup head 18, the optical storage medium drive 10 can read data stored on the optical storage medium 12 through analyzing reflected light beam received by the pickup head 18.

Typically, data on the optical storage medium 12 is stored in tracks of the optical storage medium 12. As shown in FIG. 1, only one track 13 is depicted for illustration. When the optical storage medium drive 10 is to read data in the track 13, the pickup head 18 has to be locked exactly below the track 13 and keep a fixed distance (a focal distance) apart from the bottom surface of the optical storage medium 12. Then, the pickup head 18 can direct the light beam to focus on the track 13 of the optical storage medium 12 and receive light beam reflected from the track 13 so as to ensure the completeness and correctness of data read out by the optical storage medium drive 10. For achieving the above-mentioned purpose, the optical storage medium drive 10 has a control device 30 for precisely controlling the position of the pickup head 18.

The control device 30 comprises a sensor 24, an amplifier 28, a compensator 32, and a servo device 22. The sensor 24 is optically connected to the pickup head 18 for directing a portion of reflected light beam received by the pickup head 18 into the sensor 24. Then, the sensor 24 analyzes the portion of reflected light beam to realize tracking and focusing functions of the pickup head 18 and accordingly generates a sensing signal sen. The tracking function is used to indicate whether the pickup head 18 is located exactly below the track 13. Thereafter, the amplifier 28 appropriately adjusts the amplitude of the sensing signal sen so as to generate an amplified sensing signal Amp_sen, which is then transmitted to the compensator 32. Hence, the compensator 32 determines whether or not and how to adjust the position of the pickup head 18 according to the amplified sensing signal Amp_sen transmitted from the amplifier 28. Meanwhile, the compensator 32 transmits the related information as a driving signal drv to the servo device 22. The servo device 22 is mechanically connected to the pickup head 18 and capable of driving the pickup head 18 to move fine in upward-downward direction 23A and in left-right direction 23B. After receiving the driving signal drv transmitted from the compensator 32, the servo device 22 drives the pickup head 18 to move fine according to the driving signal drv so as to achieve the purpose of controlling the position of the pickup head 18 by the control device 30.

Furthermore, after the sensor 24 generates the sensing signal sen, the sensor 24 can utilize the amplitude of the sensing signal sen to represent a position error of the pickup head 18. That is, greater amplitude of the sensing signal sen corresponds to greater deviation of the pickup head 18 away from an accurate tracking and focusing position. Conversely, zero amplitude of the sensing signal sen represents that the pickup head 18 is located at the accurate tracking and focusing position. Therefore, according to the functional relation between the sensing signal sen and the position of the pickup head 18, the compensator 32 can determine how to adjust the position of the pickup head 18 via the sensing signal sen and then drive the servo device 22 to adjust the position of the pickup head 18 according to the driving signal drv. Once the sensing signal sen cannot accurately represent the position error of the pickup head 18, that is, the relation between the sensing signal sen and the position of the pickup head 18 cannot conform to the functional relation, the driving signal drv determined by the compensator 32 is not correct and is not suitable to drive the servo device 22 to compensate the pickup head 18 to the accurate position. Incidentally, the compensator 32 is designed according to a standard functional relation.

Moreover, even in the same batch of sensors produced in the same manufacturing facility, the amplification of each sensor may be different. However, the amplification of the sensor 24 can affect the magnitude of the sensing signal sen, thus the relation between the magnitude of the amplitude of the sensing signal sen and the position of the pickup head 18 may also be changed. Additionally, optical storage mediums fabricated by different vendors may have different reflectance, which causes the of the reflected light beams to be different even when the power of the incident light beams is the same. Hence, the corresponding relation between the magnitude of the sensing signal sen and the position of the pickup head 18 is different. Consequently, since the above-mentioned inevitable interfering factors during fabrication cause the relation between the magnitude of the amplitude of the sensing signal sen and the position of the pickup head 18 to deviate from the functional relation, the compensator 32 may not accurately drive the servo device 22 to compensate the error of the position of the pickup head 18.

For ensuring the corresponding relation between the magnitude of the amplitude of the sensing signal sen and the position of the pickup head 18 conforms to the standard functional relation, the optical storage medium drive 10 further comprises a calibration device 34. When the optical storage medium 12 is placed into the optical storage medium drive 10, the calibration device 34 performs calibration so as to adjust gain of the amplifier 28, to change the magnitude of the sensing signal sen, and then to conform the corresponding relation between the magnitude of the amplitude of the sensing signal sen and the position of the pickup head 18 within the standard functional relation. Furthermore, once the calibration process has been completed, the calibration device 34 of the control device 30 is active until another optical storage medium is placed in the optical storage medium drive 10 or the optical storage medium drive 10 is initiated again.

As shown in FIG. 1, the calibration device 34 comprises a band pass filter 42, a phase comparator 44 for comparing phases of two signals, a calibration controller 46, and a signal generator 40. In the prior calibration method, the procedure for adjusting the gain of the amplifier 28 via the calibration device 34 is described as follows.

First, the signal generator 40 generates a calibration-driving signal cal_drv with a sinusoidal waveform. The calibration-driving signal cal_drv is respectively inputted to the compensator 32 and the phase comparator 44, and is used to drive the pickup head 18 to move in a reciprocating manner. The reciprocating motion of the pickup head 18 drives the sensor 24 to generate the sensing signal sen with the oscillating sinusoidal waveform. Then, the sensing signal sen is transmitted to the calibration device 34. When entering the calibration device 34, the sensing signal sen is first passed through the band pass filter 42 for noise filtering, and then inputted to the phase comparator 44. The phase comparator 44 compares the phase of the sensing signal sen with the phase of the calibration-driving signal cal_drv and generates a phase difference between these two signals according to a phase comparison rule.

The phase difference is then outputted to the calibration controller 46 to determine how to adjust the gain of the amplifier 28.

In summary, both the amplified sensing signal Amp_sen and the calibration-driving signal cal_drv of the calibration device 34 drive the servo device 22 to activate the pickup head 18, and the sensing signal sen is generated by the sensor 24 and fed back to the phase comparator 44. If the gain of the amplifier 28 causes the relation between the magnitude of the amplitude of the sensing signal sen and the position of the pickup head 18 to conform to the standard functional relation, the phase difference between the calibration-driving signal cal_drv and the sensing signal sen also conforms to a standard phase difference. Conversely, if the gain of the amplifier 28 cannot cause the relation between the magnitude of the amplitude of the sensing signal sen and the position of the pickup head 18 to conform to the standard functional relation, the phase difference between the calibration-driving signal cal_drv and the sensing signal sen also does not conform to the standard phase difference. Therefore, the calibration controller 46 can determine how to adjust the gain of the amplifier 28 according to the deviation between the phase difference from the phase comparator 44, and the standard phase difference.

The above-mentioned calibration procedure can be further described by a flow chart shown in FIG. 2. FIG. 2 is a flow chart illustrating the calibration procedure 100 for adjusting the gain of the amplifier 28 in the control device 30 of a prior art. The prior calibration procedure 100 comprises the following steps: Step 102: The flow is started. Whenever an optical storage medium is placed into the optical storage medium drive 10 or the optical storage medium drive is initiated again, the calibration procedure 100 is started.

Step 104: The calibration-driving signal cal_drv is transmitted from the signal generator 40 and the sensing signal sen from the sensor 24 is received. The amplified sensing signal Amp_sen is combined with the calibration-driving signal cal_drv to drive the servo device 22 so as to activate the pickup head 18. The sensor 24 then detects the motion of the pickup head 18 and transmits the corresponding sensing signal sen. The sensing signal sen is passed through the amplifier 28, inputted to the compensator 32, and fed back to the calibration device 34.

Step 106: The filtered sensing signal sen by the band pass filter 42 and the calibration-driving signal cal_drv are input to the phase comparator 44, and then, the phase difference between the two signals is determined.

Step 108: The calibration controller 46 determines whether the phase difference conforms to the standard phase difference. If yes, the flow jumps to step 112; if not, the flow jumps to step 110.

Step 110: Since the phase difference does not conform to the standard phase difference, that is, the relation between the magnitude of the amplitude of the sensing signal sen and the position of the pickup head 18 does not conform to the standard functional relation, the calibration controller 46 determines how to adjust the gain of the amplifier 28. Then, the procedure 100 goes back to step 104 to continue to examine whether the adjusted gain conforms the phase difference to the standard phase difference.

Step 112: The flow is completed. Since the phase difference conforms to the standard phase difference, that is, the adjusted gain of the amplifier 28 causes the relation between the magnitude of the amplitude of the sensing signal sen and the position of the pickup head 18 to conform to the standard functional relation, the procedure 100 is completed and it is ensured that the compensator 32 can compensate the position of the pickup head 18 accurately according to the sensing signal sen in the sequential actions of the optical storage medium drive 10.

Please refer to FIG. 3 for an illustration of the phase comparison rule used by the phase comparator 44 for comparing phases in the prior calibration method. FIG. 3 is a schematic diagram illustrating waveforms of the sensing signal sen and the calibration-driving signal cal_drv. In FIG. 3, the horizontal axis represents time, which is equivalent to the phase, and the vertical axis represents the magnitude of the signals. As previously described, the calibration-driving signal cal_drv with sinusoidal waveform is used to drive the pickup head 18 to move in the reciprocating manner. The reciprocating motion of the pickup head 18 drives the sensor 24 to generate the sensing signal sen with the oscillating sinusoidal waveform. Incidentally, the waveforms shown in FIG. 3 are merely exemplary. In reality, the calibration-driving signal cal_drv may be formed by several sets of pulse signals with sinusoidal envelope.

In the prior calibration method, a difference between a phase at which the sensing signal sen is zero-crossing within a period and a phase at which of the calibration-driving signal cal_drv is zero-crossing within a corresponding period is determined the phase difference between the sensing signal sen and the calibration-driving signal cal_drv. As shown in FIG. 3, the calibration-driving signal cal_drv has three periods T1, T2, and T3, which respectively corresponds to three periods C1, C2, and C3 of the sensing signal sen. Phases at which the calibration-driving signal cal_drv are zero-crossing from a negative quadrant to a positive quadrant, i.e., with an upward slope, are designated by points S1, S2, and S3. Phases at which the sensing signal sen are zero-crossing from the positive quadrant to the negative quadrant, i.e., in a downward slope, are designated by points D1, D2, and D3. Thus, by comparing the points S1, S2, S3 of the calibration-driving signal cal_drv with the points D1, D2, D3 of the sensing signal sen within the respective periods, the phase differences of the calibration-driving signal cal_drv and the sensing signal sen is determined. That is, the phase differences, or said time differences, are sequentially determined by comparing the point S1 in the period T1 with the point D1 in the period C1, the point S2 in the period T2 with the point D2 in the period C2, and the point S3 in the period T3 with the point D3 in the period C3. Thereafter, an averaged phase difference is obtained by averaging the above-mentioned three phase differences (or more phase differences determined in more respective periods) in the phase comparator 44 and then the result is output to the calibration controller 46 so as to adjust the gain of the amplifier 28 in the control device 30 according to the average phase difference.

Therefore, the above way for the calibration controller 46 to determine the accurate gain needs to acquire the accurate phase difference between the sensing signal sen and the calibration-driving signal cal_drv from the phase comparator 44. If the phase comparator 44 cannot provide the accurate phase difference to the calibration controller 46, the calibration controller 46 cannot adjust the gain of the amplifier 28 appropriately. Thus, the calibration procedure 100 is continuously repeated until the accurate phase difference is obtained. Consequently, the prior calibration method for the adjustment of the gain of the amplifier 28 is time-consuming. Additionally, the sensing signal sen fed back to the phase comparator 44 is affected by various factors, leading to transiently unstable condition. For example, when the optical storage medium drive 10 is vibrated or disturbed, the transient feedback and noise of the control device 30 causes the sensing signal sen to become unstable for a short period.

As shown in FIG. 3, the sensing signal sen is transiently unstable during the period C3, causing the period C3 to be shorter than the periods C1 and C2. Furthermore, in the period T1 and the corresponding period C1, the phase of the point S1 is ahead of the phase of the point D1. Likewise, in the period T2 and the corresponding period C2, the phase of the point S2 is ahead of the phase of the point D2. However, in the period T3 and the corresponding period C3, the phase of the point D3 is ahead of the phase of the point S3 due to the unstable sensing signal sen. Therefore, the phase difference between the points S3 and D3 is different from the phase difference between the points S1 and D1 and the phase difference between the points S2 and D2. In the prior calibration method, the phase differences between the points S1, D1, the points S2, D2, and the points S3, D3 are averaged to obtain an averaged phase difference so as to adjust the gain. Nevertheless, as previously described, since the averaged phase difference includes the phase difference of the points S3 and D3, which is negatively affected by the unstable period C3, the averaged phase difference is adversely affected by the transiently unstable sensing signal sen. Thus, for precisely adjusting the gain according to the phase difference and accurately representing the effect upon the gain of the amplifier 28, the phase difference between the calibration-driving signal cal_drv and the sensing signal sen has to be calculated under a stable condition. Moreover, since the result of the prior calibration method is easily hindered by the transiently unstable sensing signal sen, the performance of the prior calibration method is adversely affected, and then the performance of the optical storage drive 10 is substantially degraded.

SUMMARY OF INVENTION

It is therefore a primary objective of the claimed invention to provide a calibration method for a control device of an optical storage medium drive to solve the above-mentioned problem.

According to the claimed invention, a calibration method for a control device of an optical storage medium drive is disclosed. The optical storage medium drive comprises a pickup head for reading data stored in an optical storage medium. The control device has a servo device for driving the pickup head, a signal generator electrically connected to the servo device for generating a calibration-driving signal so as to drive the pickup head, and a sensor optically connected to the pickup head for generating a sensing signal. The calibration method comprises generating the calibration-driving signal by the signal generator and then generating the sensing signal by the sensor according to the calibration-driving signal, determining whether each period of the sensing signal is suitable, and comparing periods of the suitable sensing signal with corresponding periods of the calibration-driving signal to determine a phase difference between the sensing signal and the calibration-driving signal so as to adjust gain of the control device of the optical storage medium drive according to the phase difference.

It is an advantage of the claimed invention that the calibration method for the control device of the optical storage medium drive is capable of preventing the influence of unstable sensing signals to overcome the prior shortcomings and promote the performance of the optical storage medium drive.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
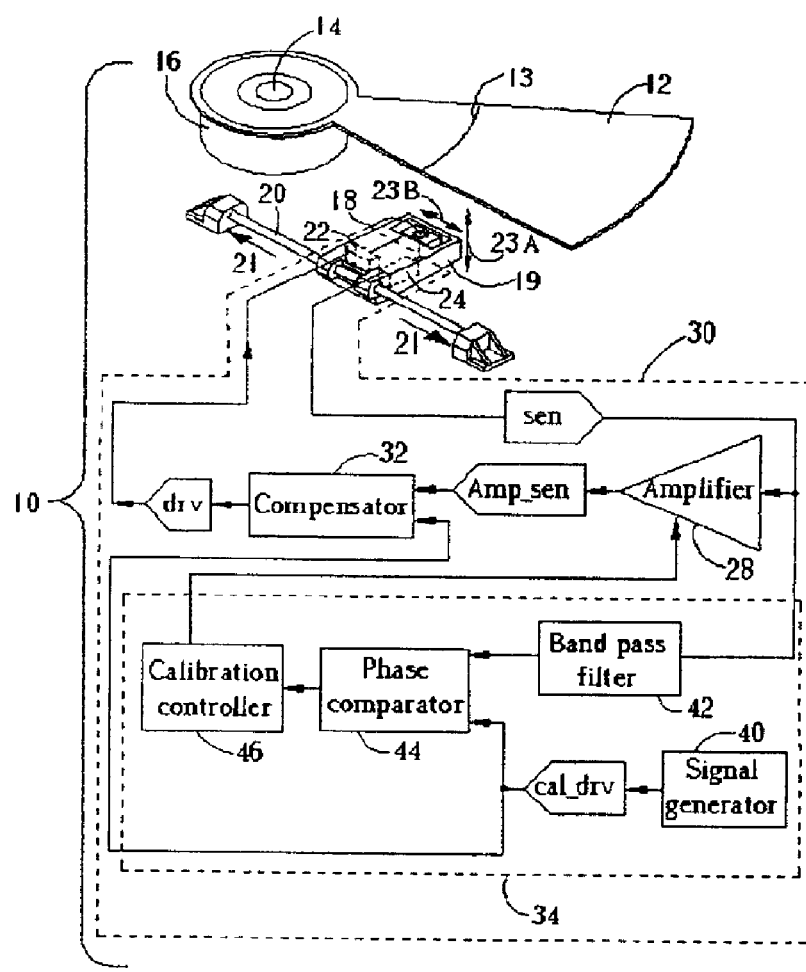
FIG. 1 is a schematic diagram illustrating the inner construction and the functional block of an optical storage medium drive.
Figure 2:
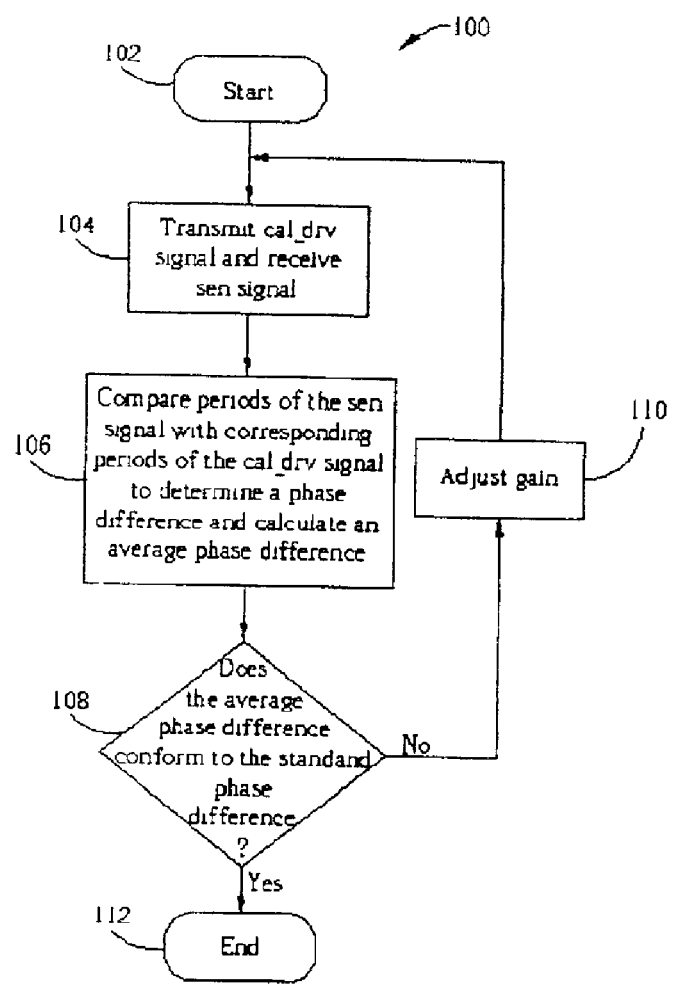
FIG. 2 is a flow chart illustrating a calibration method of the prior art.

In a calibration method of the present invention, periods of a sensing signal, which conform to a default comparison rule, are used to compare with corresponding periods of a calibration-driving signal so as to obtain a phase difference between the sensing signal and the calibration-driving signal. Since the spirit of the present invention can be extensively applied in various types of optical storage medium drives, the typical optical storage medium drive 10 shown in FIG. 1 is herein used to illustrate the calibration method of the present invention. The optical storage medium drive is for example, a CD (compact disc) drive, or a DVD (digital versatile disc) drive.

Figure 4:
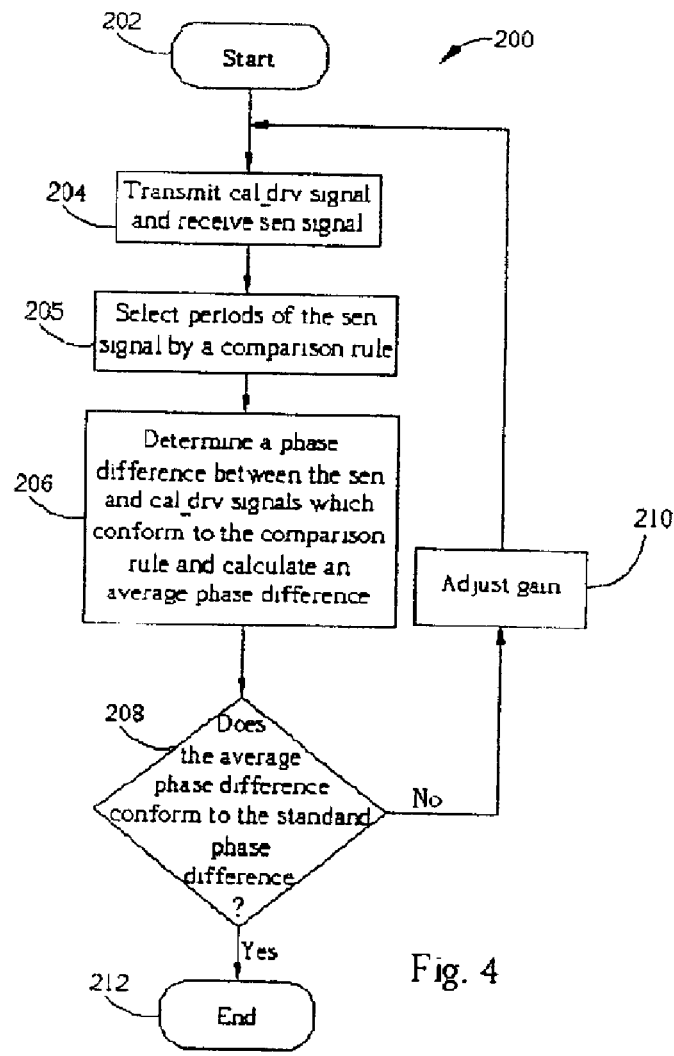
FIG. 4 is a flow chart according to a calibration method of the present invention.

Please refer to FIG. 4. FIG. 4 is a flow chart illustrating the calibration procedure 200 for adjusting gain of the amplifier 28 in the control device 30 according to the calibration method of the present invention. The calibration procedure 200 comprises the following steps.

Step 202: The flow is started. Whenever an optical storage medium is placed into the optical storage medium drive 10 or the optical storage medium drive is initiated again, the calibration procedure 200 is initiated.

Step 204: The calibration-driving signal cal_drv with sinusoidal waveform is generated by the signal generator 40; and the sensing signal sen from the sensor 24 is received by the calibration device 34. Then, the sensing signal sen is amplified as a amplified sensing signal Amp_sen. The amplified sensing signal Amp_sen is combined with the calibration-driving signal cal_drv to drive the servo device 22 so as to activate the pickup head 18 in a reciprocating motion. The sensor 24 optically connected to the pickup head 18 then detects the motion of the pickup head 18 and transmits the corresponding sensing signal sen. Then, the sensing signal sen is fed back to the amplifier 28 and the band pass filter 42. The pass-band of the band pass filter 42 has a central frequency that is equal to the frequency of the calibration-driving signal cal_drv so as to filter out noise and undesired signals of the sensing signal sen.

Step 205: The periods of the sensing signal sen are selected according to the comparison rule so as to sift out the transiently unstable periods of the sensing signal sen.

Step 206: The periods of the sensing signal sen which conform to the comparison rule are compared with the corresponding periods of the calibration-driving signal cal_drv by using the phase comparator 44 to determine the phase difference between the sensing signal sen and the calibration-driving signal cal_drv. After a predetermined amount of the phase differences corresponding to each period that conform to the comparison rule is acquired, these phase differences are averaged to obtain an averaged phase difference between the sensing signal sen and the calibration-driving signal cal_drv. Since the averaged phase difference only includes the phase differences corresponding to the periods that conform to the comparison rule, the calibration method of the present invention is not adversely affected by the transiently unstable periods.

Step 208: The calibration controller 46 determines whether the averaged phase difference conforms to a standard phase difference. If the averaged phase difference conforms to the standard phase difference, or a deviation between the averaged phase difference and the standard phase difference is smaller than a default tolerance, the flow goes to step 212. If not, the flow goes to step 210.

Step 210: Since the averaged phase difference does not conform to the standard phase difference, that is, a relation between the magnitude of an amplitude of the sensing signal sen and a position of the pickup head 18 does not conform to a standard functional relation, the calibration controller 46 determines how to adjust the gain of the amplifier 28 according to the deviation between the averaged phase difference and the standard phase difference so as to calibrate the corresponding relation between the calibration-driving signal cal_drv and the sensing signal sen. Then, the procedure 200 goes back to step 204 to continue to examine whether the adjusted gain causes the averaged phase difference to conform to the standard phase difference, and in turn to cause the relation between the magnitude of the amplitude of the sensing signal sen and the position of the pickup head 18 to conform to the standard functional relation.

Step 212: The flow is completed. Since the averaged phase difference conforms to the standard phase difference, that is, the adjusted gain of the amplifier 28 causes the relation between the magnitude of the amplitude of the sensing signal sen and the position of the pickup head 18 to conform to the standard functional relation, the procedure 200 is completed and it is ensured that the compensator 32 of the control device 30 can compensate the position of the pickup head 18 appropriately according to the sensing signal sen in the sequential operations of the optical storage medium drive 10. Meanwhile, the calibration device 34 is inactive in the sequential operations of the optical storage medium drive 10. The calibration procedure 200 is re-started until another optical storage medium is placed into the optical storage medium drive or the optical storage medium drive is initiated again.

Figure 3:
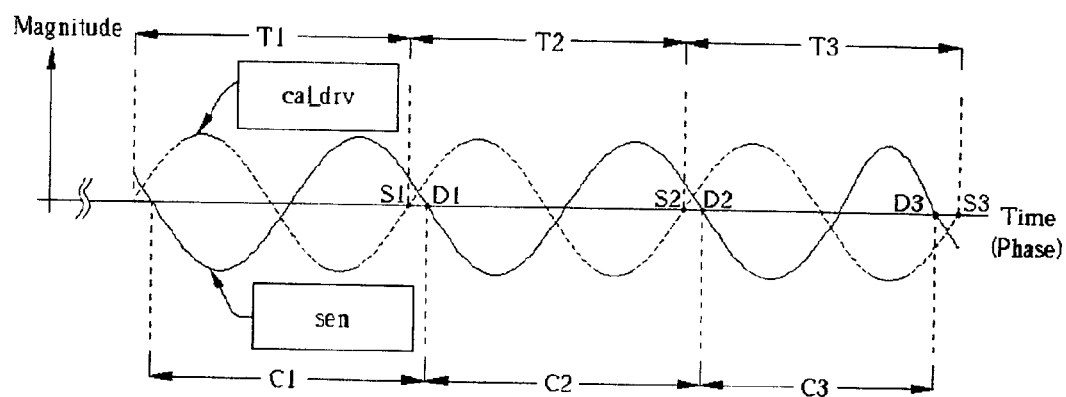
FIG. 3 is a timing diagram illustrating waveforms of a sensing signal and a calibration-driving signal with time according to the prior art.
Figure 5:
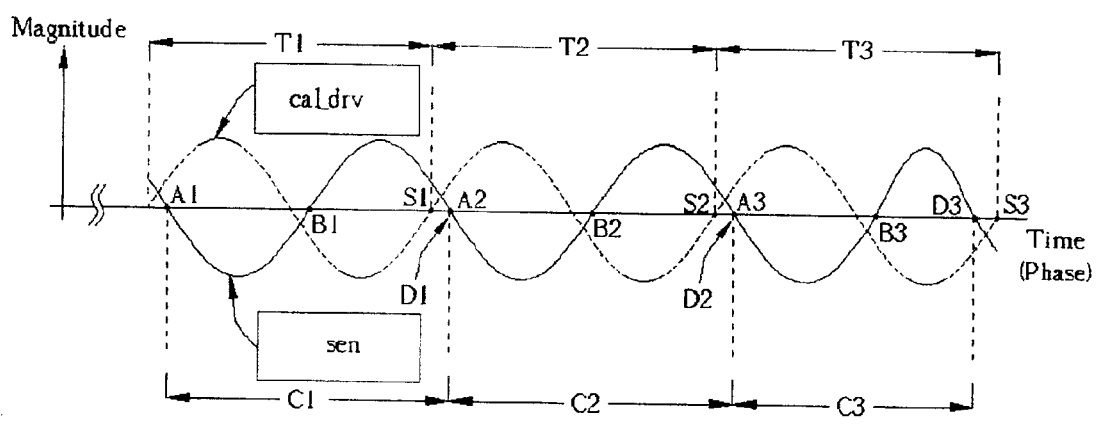
FIG. 5 is a timing diagram illustrating the selection of a sensing signal according to the calibration method of the present invention.

Please refer to FIG. 5 for an illustration of the comparison rule used by the phase comparator 44 for selecting the suitable periods of the sensing signal sen. FIG. 5 is a timing diagram illustrating waveforms of the sensing signal sen and the calibration-driving signal cal_drv. For ease of comparing the present invention with the prior calibration method, and to emphasize the advantages of the present invention, the waveform shown in FIG. 5 is similar to the waveform shown in FIG. 3. In FIG. 5, the horizontal axis represents time, which is equivalent to the phase, and the vertical axis represents magnitude of signals.

In the comparison rule of the present invention, phases at which the sensing signal sen is zero-crossing during each period are utilized, such as points A1, B1, and D1 in a period C1, points A2, B2, and D2 in a period C2, and points A3, B3, and D3 in a period C3. Then, differences between the points within the same period are calculated to determine respective time differences, or to determine phase differences. Since the sensing signal sen responds to the periodic variation of the sinusoidal waveform of the calibration-driving signal cal_drv, the time difference between two adjacent points which are zero-crossing within each period of the sensing signal sen should be substantially a half of the period of the calibration-driving signal cal_drv or within a predetermined period (for example, 175~185 degrees), that is, a phase of 180 degrees. The time difference between two adjacent points not substantially equal to half a period of the calibration-driving signal cal_drv or out of the predetermined period represents that the sensing signal sen is transiently unstable within the specific period. Then, the unstable period of the sensing signal sen is sifted out by the comparison rule of the present invention. Conversely, the condition of the time difference substantially equal to a half of the period of the calibration-driving signal cal_drv or with in the predetermined period represents that the sensing signal sen is stable within the specific period. In this case, the stable period is allowed by the comparison rule of the present invention.

For example, the sensing signal sen is zero crossing at the points A1, B1, and D1 during the period C1 as shown in FIG. 5. Both of the time differences between the points A1, B1, and between the points B1, D1 are equal to a half of the period T1 of the calibration-driving signal cal_drv. That is, the sensing signal sen is stable during the period C1. Likewise, both of the time differences between the points A2, B2, and between the points B2, D2 are equal to a half of the period T2 of the calibration-driving signal cal_drv. That is, the sensing signal sen is stable during the period C2. However, the time difference between the points B3 and D3 is not equal to a half of the period T3 of the calibration-driving signal cal_drv. That means that the sensing signal sen is unstable during the period C3. Consequently, the period C3 of the sensing signal sen is sifted out. In summary, once a time difference between two adjacent points which are zero-crossing within a period of the sensing signal sen is not substantially equal to a half of a period of the calibration-driving signal cal_drv or out of the predetermined period, the period of the sensing signal sen is sifted out by the comparison rule of the present invention.

After step 205, the calibration procedure 200 goes to step 206 for comparing the periods of the sensing signal sen that conform to the comparison rule with corresponding periods of the calibration-driving signal cal_drv so as to determine a phase difference. The method for acquiring the phase difference is similar to the prior calibration method. As Shown in FIG. 5, since the period C1 of the sensing signal sen conforms to the comparison rule, the phase difference between the point D1 in the period C1 and the point S1 of the calibration-driving signal cal_drv, which is zero-crossing during the period T1, is used in calculating the averaged phase difference. Likewise, since the period C2 of the sensing signal sen also conforms to the comparison rule, the phase difference between the point D2 in the period C2 and the point S2 of the calibration-driving signal cal_drv, which is zero-crossing during the period T2, is also used in calculating the averaged phase difference. However, since the period C3 of the sensing signal sen does not conform to the comparison rule, the phase difference between the points D3 and S3 is not used to calculate the averaged phase difference.

In the prior calibration method, since the averaged phase difference includes the phase difference of the points S3 and D3, which is obtained from the unstable period C3, the averaged phase difference is adversely affected by the transiently unstable sensing signal sen and the performance of the prior art calibration method is thus also adversely affected.

In contrast to the prior art, the calibration method of the present invention can select suitable periods of the sensing signal that conform to the comparison rule and sift out the transiently unstable periods so as to ensure that the averaged phase difference can more precisely represent the phase difference between the sensing signal and the calibration-driving signal. Consequently, the efficiency of the calibration method is substantially improved so that the optical storage medium drive can execute the subsequent operations smoothly.

A typical optical storage medium drive has two sets of control devices for tracking error and focusing error, respectively. The optical storage medium drive that utilizes the calibration method of the present invention can calibrate gain of these two sets of the control devices simultaneously so that the relation between the magnitude of the amplitude of the sensing signal and the position of the pickup head can conform to the standard functional relation. In addition to points that are zero-crossing during a specific period, the comparison rule of the present invention may also take the stability of a period before the specific period as another reference for selection.

Besides, the invention is suitable for optical reading or writing drive, for example, CD-ROM drive, CD-R/RW drive, DVD-ROM drive, DVD player, DVD-R drive, DVD-RAM drive, DVD+RW drive, DVD-RW drive and the like.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A calibration method for an optical storage medium drive, the optical storage medium drive comprising:
   a pickup head for reading or recording data from or to an optical storage medium;
   a servo device for driving the pickup head;
   a signal generator for generating a calibration-driving signal; and
   a sensor optically connected to the pickup head for generating a sensing signal;
   the calibration method comprising:
   using the signal generator to generate the calibration-driving signal and then using the sensor to generate the sensing signal according to the calibration-driving signal;
   determining whether each period of the sensing signal conforms to a comparison rule; and
   sifting out periods of the sensing signal which do not conform to the comparison rule and comparing periods of the sensing signal that conform to the comparison rule with corresponding periods of the calibration-driving signal to determine a phase difference between the sensing signal and the calibration-driving signal so as to adjust gain of the control device of the optical storage medium drive according to the phase difference.

2. The calibration method of claim 1, wherein when an amplitude of the sensing signal reaches a predetermined magnitude of the amplitude within the period, it is decided whether the amplitude of the sensing signal is capable of re-reaching the predetermined magnitude of the amplitude after a predetermined time interval.

3. The calibration method of claim 2, wherein the predetermined magnitude of the amplitude is zero.

4. The calibration method of claim 2, wherein the predetermined time interval is a half of the period.

5. The calibration method of claim 1, wherein when an amplitude of the sensing signal reaches a predetermined magnitude of the amplitude within predetermined duration before the period, it is decided whether the amplitude of the sensing signal is capable of re-reaching the predetermined magnitude of the amplitude after a predetermined time interval.

6. The calibration method of claim 1, wherein the sensor is used for sensing a tracking error of the pickup head.

7. The calibration method of claim 1, wherein the sensor is used for sensing a focusing error of the pickup head.

8. A control device of an optical storage medium drive, the optical storage medium drive comprising:
   a pickup head for reading or recording data from or to an optical storage medium;
   a signal generator electrically for generating a calibration-driving signal; and
   a sensor optically connected to the pickup head for generating a sensing signal;
   the control device comprising:
   a servo device for driving the pickup head;
   wherein when the pickup head is driven by the calibration-driving signal, the control device will determine whether each period of the sensing signal conforms to a comparison rule, sift out periods of the sensing signal which do not conform to the comparison rule, and compare periods of the sensing signal that conform to the comparison rule with corresponding periods of the calibration-driving signal to determine a phase difference between the sensing signal and the calibration-driving signal so as to adjust gain of the control device according to the phase difference.

9. The control device of claim 8, wherein when an amplitude of the sensing signal reaches a predetermined magnitude of the amplitude within the period, it is decided determines whether the amplitude of the sensing signal is capable of re-reaching the predetermined magnitude of the amplitude after a predetermined time interval.

10. The control device of claim 9, wherein the predetermined magnitude of the amplitude is zero.

11. The control device of claim 9, wherein the predetermined time interval is a half of the period.

12. The control device of claim 8, wherein when an amplitude of the sensing signal reaches a predetermined magnitude of the amplitude within predetermined duration before the period, it is decided whether the amplitude of the sensing signal is capable of re-reaching the predetermined magnitude of the amplitude after a predetermined time interval.

13. The control device of claim 8, wherein the sensor is used for sensing a tracking error of the pickup head.

14. The control device of claim 8, wherein the sensor is used for sensing a focusing error of the pickup head.

15. An optical storage medium drive, comprising:
   a pickup head for reading or recording data from or to an optical storage medium;
   a servo device for driving the pickup head;
   a signal generator electrically connected to the servo device for generating a calibration-driving signal; and
   a sensor optically connected to the pickup head for generating a sensing signal;
   a control device;
   wherein when the pickup head is driven by the calibration-driving signal, the control device will determine whether each period of the sensing signal conforms to a comparison rule, sift out periods of the sensing signal which do not conform to the comparison rule, and compare periods of the sensing signal that conform to the comparison rule with corresponding periods of the calibration-driving signal to determine a phase difference between the sensing signal and the calibration-driving signal so as to adjust gain of the control device according to the phase difference.

16. The optical storage medium drive of claim 15, wherein when an amplitude of the sensing signal reaches a predetermined magnitude of the amplitude within the period, it is decided determines whether the amplitude of the sensing signal is capable of re-reaching the predetermined magnitude of the amplitude after a predetermined time interval.

17. The optical storage medium drive of claim 16, wherein the predetermined magnitude of the amplitude is zero.

18. The optical storage medium drive of claim 16, wherein the predetermined time interval is a half of the period.

19. The optical storage medium drive of claim 15, wherein when an amplitude of the sensing signal reaches a predetermined magnitude of the amplitude within predetermined duration before the period, it is decided whether the amplitude of the sensing signal is capable of re-reaching the predetermined magnitude of the amplitude after a predetermined time interval.

* * * * *